Patented Dec. 31, 1929

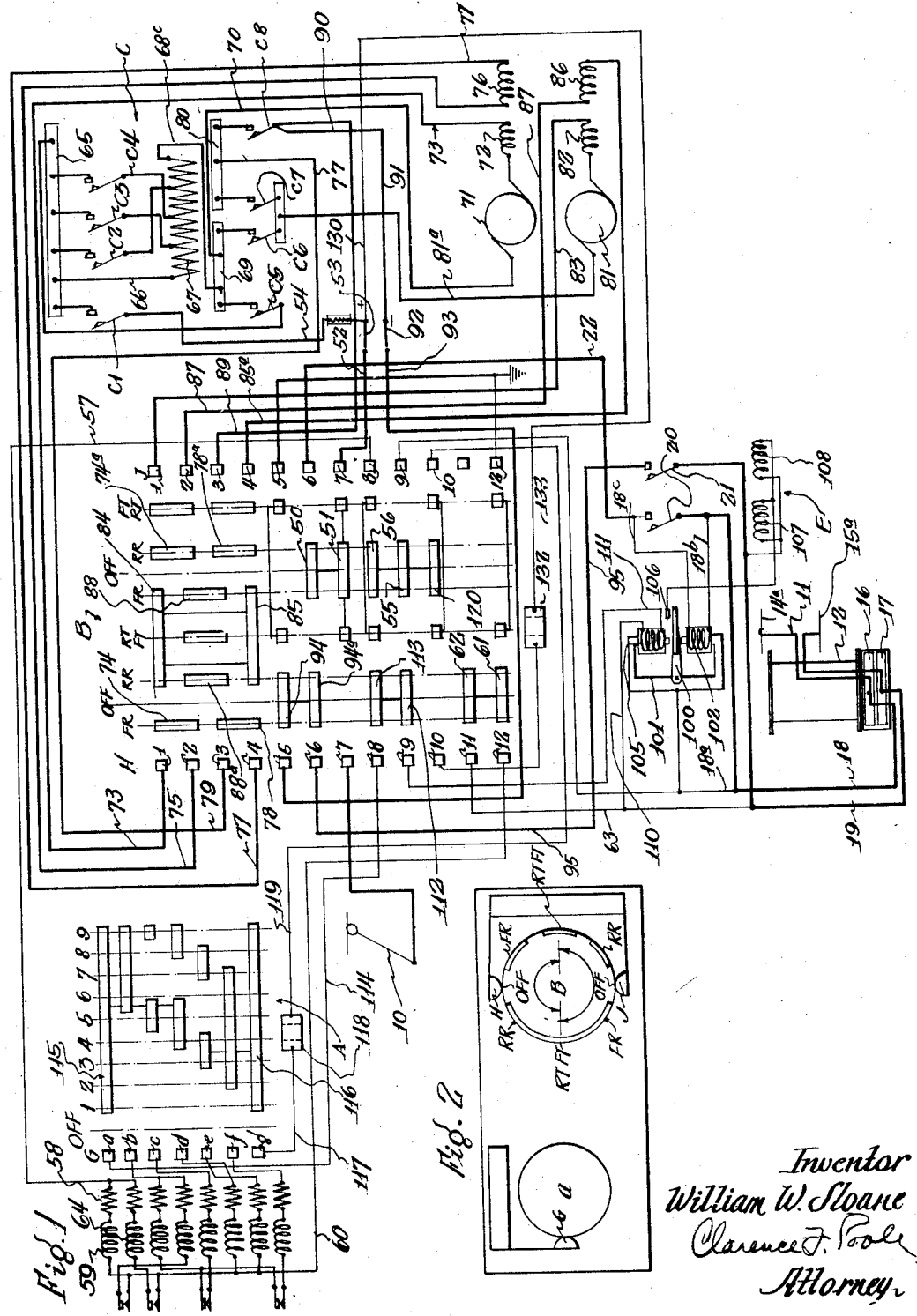

1,742,013

UNITED STATES PATENT OFFICE

WILLIAM W. SLOANE, OF CHICAGO, ILLINOIS, ASSIGNOR TO GOODMAN MANUFACTURING COMPANY, OF CHICAGO, ILLINOIS, A CORPORATION OF ILLINOIS

MINE-LOCOMOTIVE SAFETY DEVICE

Application filed February 23, 1928. Serial No. 256,095.

This invention relates to improvements in mine locomotive safety devices, and more particularly to mine locomotives of the explosion-proof type, adapted for use in gaseous mines, and has for its principal object to provide means for automatically preventing operation of the main circuit connections of the locomotive under conditions where leakage of the power circuits on the locomotive occurs, before such leakage becomes great enough to cause sparks between the locomotive wheels and the tracks.

As heretofore constructed, mine locomotives have been provided with many safety devices wherein the electrical parts are enclosed in explosion-proof housings and especial precautions are also taken with respect to the reeling and handling of power cables utilized for supplying current to such locomotives, all with a view of eliminating, in so far as humanly possible, any danger of explosions under gaseous conditions due to exposed arcs or sparks caused either accidentally or otherwise incidental to the operation of such locomotives.

It has been recently demonstrated however, that in spite of the most careful construction of such locomotives with all electrical parts enclosed and other extra precautions, there is still the possibility of sparks being caused under abnormal conditions, where the insulation within the locomotive becomes damp, as for instance by formation of moisture of condensation thereon so as to permit current leakage in relatively small amounts to the locomotive frame and thence through the wheels to the mine tracks. It has been found further that conditions under which such leakage may occur vary considerably and widely and that it is practically impossible to eliminate such conditions entirely with the relatively high voltages usually employed in mine locomotives.

One of the practical difficulties encountered in the design and construction of a suitable protective device is the provision of an electrical apparatus which will be responsive to leakages of such small current value as to represent a very small proportion of the normal working currents, but which may, if exposed in gaseous areas of a mine, cause an arc of sufficient intensity to cause an explosion. For instance, it has been demonstrated that a current leakage of as small as one-tenth of an ampere may cause a spark of sufficient intensity to ignite mine gases in circuits where the normal current value of the main operating circuit is approximately 200 amperes in a 500 volt motor. It is manifestly quite difficult to provide a practical electrical apparatus of sufficient sensitivity to detect or measure leakages which would amount to only 1/2000 of the normal current requirements of the locomotive.

In carrying out my invention I have provided a novel circuit arrangement whereby the requirement for highly sensitive current difference detecting devices is eliminated and in its stead I employ a simple test circuit arrangement wherein the leakage, if any, is measured and detected directly each time that the main current return line is disconnected as for instance, in stopping, or reversing the motor, and utilizing contact devices operative automatically to make it impossible to reestablish the main power connections as long as the current leakage is sufficient to be dangerous.

Thus, in my improved form of test circuit, the power circuit is tested at very frequent intervals. For instance, in the ordinary operation of a mine locomotive in dangerous gaseous areas, it is seldom, if ever, operated in one direction for more than a minute or two at a time without either stopping, starting or reversing thereof, while it takes much longer to form condensation or "sweating" of the insulation in sufficient amounts to cause appreciable leakage. Thus, any leakage will be detected during one of the "test" periods while stopping or reversing of the motor, long before such leakage has grown to dangerous proportions.

The invention may best be understood by reference to the accompanying drawing, in which:

Figure 1 is a wiring diagram illustrating a typical installation in a combination trolley and reel locomotive; and Figure 2 is a diagrammatic plan view showing the relative arrangement of the controller drum, reverse drum and their respective contact fingers.

Referring to the details shown in Figure 1, it will be seen that the locomotive herein illustrated utilizes the contactor type of control which is preferable in relatively heavy duty locomotives in which leakage losses are particularly likely to occur. It will be understood however, that my invention may be applied equally as well to manually resistance controlled circuits.

The main parts of the circuit illustrated herein comprise a controller drum A, a reverse drum B (which in the present instance also includes means for switching the current from the trolley to the reel and vice-versa), the resistance contactor devices C, traction motors D, D, and the leakage testing apparatus E. Current is supplied through trolley 10 or cable 11 mounted as usual on a cable reel 12. In the form shown the cable reel 12 is actuated by a reel motor 13 having starting apparatus therefor indicated generally at F, as will hereinafter more fully be described.

It will be understood that the safety device forming the subject matter of the present invention is required only when the locomotive is operating in portions of the mine remote from the main haulage entries, which portions, due to the lack of ventilation, may possibly contain explosive gases in sufficient quantities to be ignited in case of accidental sparking incident to the use of the locomotive. As is well known, when locomotives of this character are operating in such remote and possibly gaseous portions of the mine, they receive their current supply through the cable 11 rather than through the trolley 10. Accordingly, in the form shown, my novel leakage testing apparatus is effective only in the circuit when the power is supplied through the cable and its reel.

The several operative positions of the combined reverse and power switch drum B are indicated diagrammatically in Figure 1 and also in plan view in Figure 2, from which it will be seen that said drum has two sets of contact fingers indicated generally at H and J, and that said drum is capable of being rotated through an arc of 180°, giving five different positions. The general arrangement of the sets of contacts are shown in greater detail in the diagram in Figure 1. When contact fingers H and J are in their respective "off" positions, as in Figure 2, they are diametrically on opposite sides of said reverse drum. Rotation of the reverse drum to the first position in a counter-clockwise position establishes a connection for forward reel, as indicated by the letters FR in Figure 1, and further rotation in a counter-clockwise direction for a full 90° from the "off" position establishes a connection for forward trolley, as indicated by the letters FT. Rotation of the drum in a clockwise direction from the "off" position provides a connection for reverse reel operation, as indicated by the letters RR, and a further 90° rotation in a clockwise direction establishes a connection for reverse trolley operation, as indicated by the letters RT. It will be seen from Figure 2 that due to the fact that the two sets of contact fingers H and J are diametrically opposed to each other, the fingers H engage the same line of segments in the forward trolley (FT) position as are engaged by the opposite set of fingers J in the reverse trolley (RT) position when the drum B is rotated through its full 180° arc. Similarly, the line of segments engaged by fingers J in the forward trolley (FT) position are engaged by the fingers H when the drum is in the reverse trolley (RT) position.

Although I have described in general the several positions of the reverse drum relative to the contact fingers H and J for operating both from the reel and trolley, it will be understood from the foregoing description that the leakage measuring or test circuits forming the subject matter of the present invention, is preferably operative only when the locomotive is receiving its current supply through the cable 11 and its reel connections. Consequently I need only point out in detail the operative connections established when the reverse drum B is in its forward and reverse reel positions, that is to say, the first positions in one or the other direction from the "off" position (FR and RR).

It will be understood, of course, that in order to supply current through the cable 11, the end of said cable is connected to its source of current supply in the usual manner, as for instance, in a main entry adjacent the room or area in which the locomotive is to be operated, with the positive conductor 14 of said cable directly connected to a trolley line 14ª and the negative conductor 15 grounded on the track rail 15ª.

Assuming now that the reverse drum B is in the forward reel position, the power of the duplex cable 11 is supplied to the collector rings 16 and 17 on the reel 12, thence through positive and negative cables 18 and 19 through the main power circuit, provided there is no ground or leakage on the locomotive sufficient to actuate the automatic cut-out devices of the test circuit.

The special function and operation of the test circuit will be hereinafter described in detail, but for the time being it will be assumed that there is no leakage and therefore the test circuit is inoperative. Under such conditions the main contactors 20 and 21 are assumed to be closed to establish proper power connections to the main circuit. The positive cable 18 is then connected through contactor 20 and conductor 22 to finger $J^6$ on the reverse drum B. With the reverse drum in the forward reel position, finger $J^6$ engages contact 50, and connects to finger $J^7$ through segment 51. From $J^7$, current passes through conductor 52, switch 53 and conductor 54 to contactor $C^1$. Contactor $C^1$ will be closed by establishing another circuit branching from main conductor 18 at conductor $18^a$ to finger $J^9$ on reverse drum B, thence through segments 55 and 56 to finger $J^8$. From thence the circuit passes through conductor 57, resistance 58 to contactor closing coil 59 which is associated with contactor $C^1$. The contactor closing circuit is completed through conductor 60, finger $H^{12}$, segments 61 and 62 on reverse drum B, finger $H^{11}$ and conductor 63 to minus conductor 19. Similarly, the conductor $C^7$ is closed by closing coil 64 in circuit parallel with the closing coil 59.

The closing of contactors $C^1$ and $C^7$ then completes the main circuit through the motors in the following manner:

The current through conductor 54 passes through contactor $C^1$ to bus-bar 65 through conductor 66, resistance 67, conductor 68 and bus-bar 69. From said bus-bar connection is made through conductor 70, motor 71, interpole coil 72, conductor 73, contact finger $H^1$, contact segment 74, finger $H^2$, conductor 75, series field coil 76, conductor 77 to finger $H^4$ on reverse drum B. Said finger in the forward reel position is engaged with segment contact 78 and through said contact to finger $H^3$ and from thence through conductor 79 to bus-bar 80. The contactor $C^7$ being closed as aforesaid, and being connected to the bus-bar 80 the circuit is established through the second motor 81 by means of conductor $81^a$ and a series of conductors and connected elements 82, 83, finger $J^1$, segment contacts 84 and 85, finger $J^4$, conductor $85^a$, series field coil 86, conductor 87, finger $J^2$, contact segment 88, finger $J^3$, conductor 89 to contactor $C^8$. From $C^8$ in the open position a conductor 90 leads directly to the negative power line 91.

The circuit from power line 91 is through negative main switch 92, conductor 93, to finger $H^5$, which in the forward reel position engages contact segment 94 on power reverse switch, thence through contact segment $94^a$ to finger $H^6$, and thence through conductor 95 to contactor 21. With the circuit arrangements above described, circuit has now been established through the motors 71 and 81 and the necessary connections on the reverse drum B, provided contactors 20 and 21 of the main circuit are closed. Furthermore, as will presently appear, a "test" circuit has been established, including all of the parts previously mentioned up to the contactors 20 and 21, when these contacts are open, with the exception of the branch contactor closing circuit through the contactor coils 59 and 64 controlled by the main controller A, which branch circuit is necessary in order to initially establish the main power circuits, as described.

The contactors 20 and 21 however, can not be closed unless the main controller drum A is moved to one of its operative positions. The circuit arrangements through the controller drum A for closing the contactors 20 and 21 during normal operation of the locomotive (without leakage) will now be described.

Contactors 20 and 21 are actuated by coils 107 and 108 connected in parallel across main lines 18 and 19 and controlled by armature 100 of a leakage relay 101. The arrangement is such that when said armature is in raised position it closes the circuit through auxiliary contact 106 and coils 107 and 108 so as to close contactors 20 and 21. Armature 100 is actuated by coil 105, hereinafter called the closing coil, which is connected to one side direct to minus power lead 19 and on the opposite side through controller drum A and associated parts as follows:

From conductor 111 to finger $H^9$, contact segments 112 and 113 and finger $H^8$ on the reverse drum to conductor 114 which leads to finger $Ga$ on the controller drum. Said controller drum A may be of any suitable construction, as herein shown being of the series-parallel type, in which the several resistance contactors $C^1$, $C^2$, etc. are closed by energizing their associated coils similar to coils 59 and 64, controlled by the controller drum A in the usual manner, but inasmuch as the relay closing coil 105 is energized when said drum is in any one of several positions of operation, a further detailed description of the arrangement of segments on said controller drum is not necessary. Thus, while the controller drum A is in the off position the circuit will be broken at finger $Ga$ but as soon as it is rotated into any one of its operative positions, the circuit will be completed through the several intermediate segments 115 to lower segment 116 and thence to finger $Gg$. From the latter finger the circuit is established through conductor 117, blow-out coil 118, conductor 119 to finger $J^{10}$ on the reverse drum B. When the latter is in the forward reel position, as herein assumed, said finger engages segment 120 and said current is established through said segment and the adjacent segment 55, which has heretofore been described as forming part of the contactor closing circuit, and from said segment is connected to the plus power line $18^a$ through a finger $J^9$ also previously described as forming part of said contactor closing circuit.

From the above description it will now be understood that whenever the main controller drum A is in any one of its operative positions, the closing coil 105 tends to raise the armature 100 so as to close an energizing circuit through coils 107 and 108 of contactors 20 and 21.

Having now described the normal operative connections for the circuit when in the forward reel position, the remaining portions of the testing apparatus and the operation of the apparatus, whereby tests for leakage are provided, will now be described.

Armature 100 of test relay 101 has, in addition to the closing coil 105 previously described, a coil 102 arranged in opposition thereto, which coil is hereinafter referred to as the leakage coil. This coil bridges the circuit across the contactor 20 in the positive main line circuit previously described, by means of conductors 18$^b$ and 18$^c$. Thus, in the event of a ground leakage at any portion of the completed test circuit, potential for said test circuit is supplied through conductors 18$^b$ and 18$^c$ and leakage coil 102. Accordingly, if there be a ground, armature 100 will be held against leakage coil 102 with sufficient energy to overcome the power of opposing coil 105 and thus making it impossible to make contact between said armature and the auxiliary contact 106 connected to coils 107 and 108 which normally tend to close contactors 20 and 21 respectively. It will therefore be impossible to operate the locomotive owing to the fact that contactors 20 and 21 are maintained in open position. In other words, it is impossible to establish a main operating circuit in the locomotive at any time that there is sufficient leakage from the positive side of said operating circuit to actuate the leakage coil 102. It will be observed however, that the testing apparatus above described operates only while the controller drum is in the off position, since when the main circuits have been established through the contactors 20 and 21, the leakage coil 102 is shorted and will thereafter be ineffective until the controller again has been returned to its off position.

From the above description of the operating circuits, it will be understood that I have described only the connections of the reverse drum and power switch B for forward reel position. It will be manifest to any one skilled in the art that a similar test circuit will be set up when the reverse drum and power switch B is moved to the reverse position in which case the circuits may readily be traced through substantially the same paths as in the forward reel position with the main exception that the current is reversed through the motors 71 and 81 by rearranging the connections through the fingers H$^1$, H$^2$, H$^3$ and H$^4$, so that finger H$^1$ is connected to H$^4$ through segments 84 and 85, and H$^2$ is connected to H$^3$ through segment 88$^a$. By similar movement of the set of fingers J on the opposite side of the reverse drum B, connections are rearranged so that finger J$^1$ is connected with J$^2$ through segment 74$^a$ and J$^3$ is connected with J$^4$ through segment 78$^a$. It will be observed however, that these changes in the position of the reverse drum B affects only the substitution of different sets of segments in the main test circuit which is established in either forward reel or reverse reel position, as described.

I claim as my invention:

1. In an electric locomotive including a main circuit control device, switch means in the main power lines adjacent the point of power supply to said locomotive, a test circuit including said power lines and their associated control circuits on said locomotive beyond said switch means, means for automatically closing said switch means when said current control device is in operative position, a test circuit connection bridging said main power line switch, and means responsive to current leakage from said test circuit when said power line switch is open to render said switch closing means inoperative.

2. In an electric locomotive including a resistance control device, switch means in the main power lines adjacent the point of power supply to said locomotive, a test circuit including said power lines and their associated control circuits on said locomotive beyond said switch means, means for automatically closing said switch means when said current control device is in operative position, a test circuit connection bridging said main power line switch, and means responsive to current leakage from said test circuit when said power line switch is open to render said switch closing means inoperative.

3. An electric locomotive having its main power lines insulated from the locomotive frame, and cable reel power supply connections for said locomotive including a duplex cable having one side thereof adapted to be grounded on the track, a main circuit control device, switch means on the main power lines adjacent said cable reel connections on said locomotive, a test circuit including said power lines and their associated control circuits on said locomotive beyond said switch means, means for automatically closing said switch means when said current control device is in operative position, a test circuit connection bridging said main power line switch, and means responsive to current leakage from said test circuit through said locomotive frame to ground when said power line switch is open to render said switch closing means inoperative.

Signed at Chicago, in the county of Cook and State of Illinois, this 10th day of February, A. D. 1928.

WILLIAM W. SLOANE.